3,109,513
PULSE LUBRICATION METHOD
Howard H. Shakely, Coraopolis, Pa., assignor to Jones & Laughlin Steel Corporation, Pittsburgh, Pa., a corporation of Pennsylvania
Filed Aug. 18, 1960, Ser. No. 50,545
4 Claims. (Cl. 184—1)

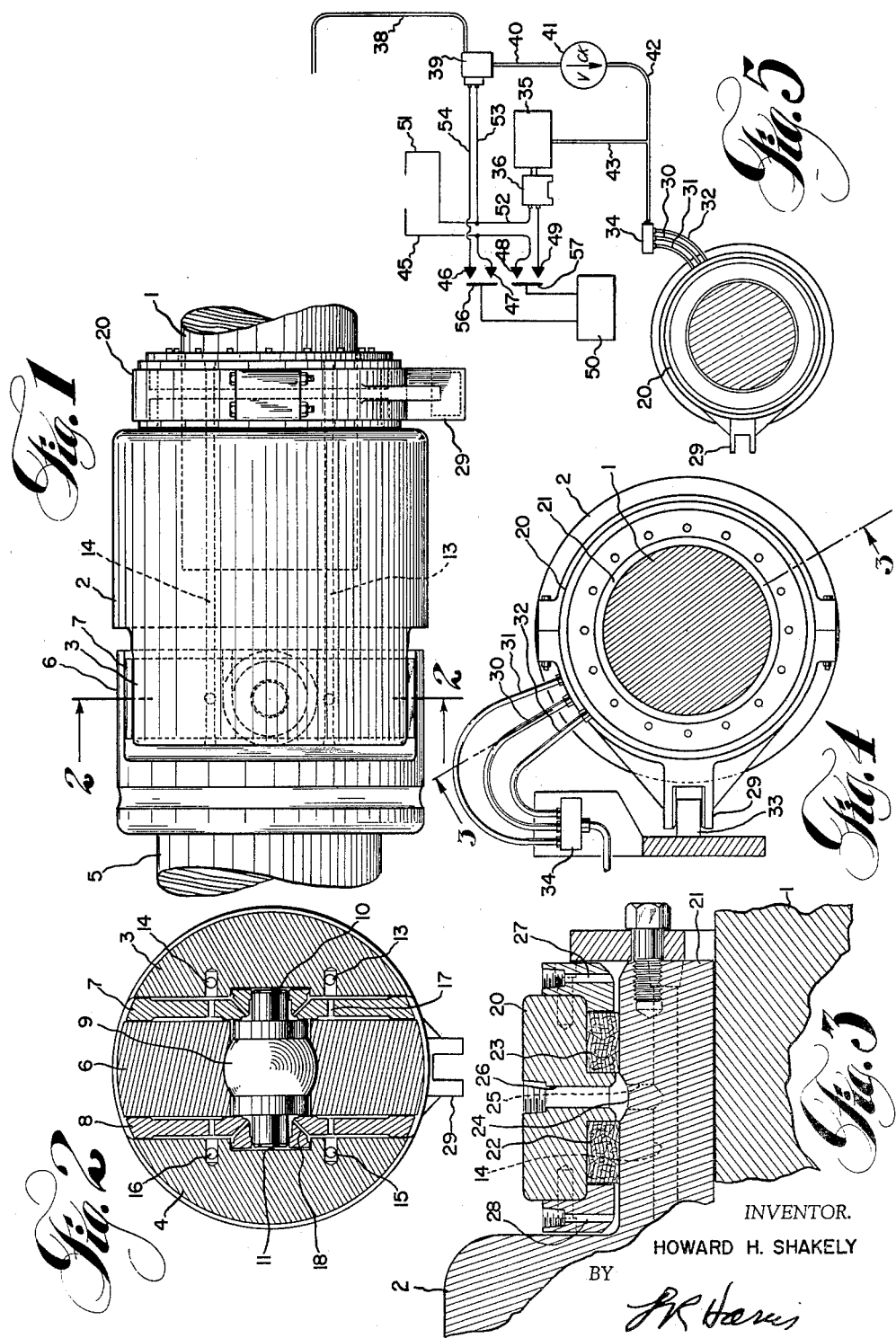

This invention relates to a process for lubricating rolling mill spindles and the like. It is more particularly concerned with a process for lubricating inaccessible wear surfaces of rolling mill spindles and the like which must operate in a dirt-contaminated environment.

In rolling mills for hot rolling steel and like metals, the individual rolls are driven by spindles which must transmit drive to the rolls while permitting the rolls to move apart and be brought together a substantial amount. Therefore, the drive spindles must be coupled to both the rolls and the pinions, or other means for transmitting power, by some form of universal joint. It is common to provide the driving end of a roll with an axially extending projection known as a "spade" which is coupled to a mating recess in a spindle by means of a transverse pin so as to permit movement of the rolls transverse to their axes of rotation. To reduce wear between the mating faces of the roll spade and the spindle coupling, those elements are usually separated by plates of a soft material, such as brass, which are commonly called "slippers." It is necessary to introduce lubricant at the interfaces of the slippers and the spade and spindle end faces and it is also necessary to introduce lubricant between the transverse pin and the recesses in the spade and the spindle end in which this pin seats. Because the roll and the spindle are rotating, the lubricant must travel to the wear areas through passageways or holes drilled through the spindle, and the lubricant is conventionally introduced into those passages through a slip ring arrangement mounted on the spindle adjacent the coupling end.

In the hot rolling of steel mill scale breaks off from the material being rolled, and as this scale is quite brittle in itself a considerable amount of it is reduced in size to small particles which settle in the immediate vicinity of the mill and find their way into the mill drive. Water sprays are also quite generally used between stands to assist in scale removal and water droplets, contaminated with scale and other dirt, also settle on the mill drive and find their way into the spindle couplings. Particles of scale and other dirt mix with moisture and excess lubricant used in lubricating the spindle couplings to form a semisolid material which clogs lubricating passages and channels and may shut off the flow of lubricant to the slippers or wear plates above-mentioned. When this happens, the wear on the slippers and the pin rapidly renders these parts unfit for service and requires the mill be shut down for their replacement.

It is an object of my invention, therefore, to provide a process of lubricating spindle couplings and the like which will prevent the clogging of lubricating passages and consequent early failure of lubricated elements. It is another object of my invention to provide a process of utilizing air and lubricant under pressure so as to effect the positive lubrication of mill spindles and the like. It is another object of my invention to provide a process of delivering lubricant to the wear surfaces of mill spindles and the like in discrete quanta or slugs in such a way as to lubricate the desired surfaces and prevent the plugging of lubricating channels. Other objects of my invention will become evident in the course of the following description and explanation thereof.

Reference is now made to the attached figures which illustrate a known form of mill spindle coupling adapted for an embodiment of the process of my invention presently preferred by me.

FIG. 1 is an elevation of the end of a spindle provided with a roll end coupling, together with the spade end of a roll coupled thereto.

FIG. 2 is a cross section through FIG. 1 on the plane marked 2—2.

FIG. 3 is an enlarged partial cross section taken on the plane 3—3 of FIG. 4.

FIG. 4 is an end view of a mill spindle together with a collar attached thereto through which lubricating fluid is introduced.

FIG. 5 is a schematic diagram of air and lubricant supply apparatus connected to the collar of FIG. 4.

Drive spindle 1 is provided with an enlarged coupling 2, the end of which is slotted so as to leave spaced axially projecting members 3 and 4. Roll 5 is provided on one end with an axially elongated projection 6 of more or less rectangular cross section commonly known as a "spade." Spade 6 is dimensioned to fit between projecting ends 3 and 4 of spindle coupling 2, with clearance. The clearance space between spade 6 and projections 3 and 4 of the spindle coupling 2 is taken up by wear plates or slippers 7 and 8, respectively. The central area of spade 6 is cut out to accept a transverse pin 9, the central portion of which may be more or less spherical, as shown. The ends of the pin fit in recesses 10 and 11 of the projecting ends 3 and 4, respectively, of spindle coupling 2 and bear against portions of slippers 7 and 8, as is shown in FIG. 2.

Coupling 2 is provided with axially positioned drilled channels or passageways 13, 14, 15 and 16, as shown. At the outer end of coupling 2 these channels or passageways intersect short transverse passageways which allow lubricant to reach the interfaces between slippers 7 and 8 and the projecting ends 3 and 4 of spindle coupling 2. The slippers are themselves provided with transverse bores, such as those designated 17 and 18 in FIG. 2, which permit lubricant to pass from the outside to the inside of the slippers and reach the surfaces of spade 6 as well as pin 9.

Lubricant is introduced into bores or channels 13, 14, 15 and 16 through stationary collar 20. Collar 20 surrounds cylindrical projecting end 21 of spindle coupling 2. Sealing rings 22 and 23 permit coupling 2 to rotate with respect to collar 20 but maintain a lubricant seal between those moving parts. The exterior surface of projection 21 of coupling 2 is provided with an annular groove 24 which communicates with axial bore 14 through a short transverse bore 25 and with the other axial bores or channels 13, 15 and 16 through like transverse bores not shown. Collar 20 is provided with a transverse bore 26 positioned so as to communicate with annular channel 24. The outer edge of collar 20 is provided with a transverse bore 27 which communicates with the space between collar 20 and projection 21 at that edge and the inner edge of collar 20 is likewise provided with a transverse bore 28 which communicates with the space between collar 20 and projection 21 at that edge. A pipe 30 connects bore 26 to a manifold 34 and like pipes 31 and 32 connect bores 27 and 28 to that same manifold. A lug 29 projecting radially from collar 20 mates with a lug 33 so as to hold collar 20 stationary as coupling 2 rotates.

I prefer to supply lubricant to my manifold 34 by a metering pump 35, or like device, driven by a motor 36. The line supplying lubricant to pump 35 is not shown as this is conventional. I also supply compressed air to manifold 34 from a supply line 38 through solenoid valve 39 into pipe 40, thence through check valve 41 to pipe 42, which connects with manifold 34. Pump 35 is connected to pipe 42 by pipe 43.

Electrical conductor 45 is connected to a source of electrical power, not shown, at one end and at the other to contacts 47 and 48 of timer 50. Electrical conductor 51 is connected at one end to the same source of power and at the other end to conductor 52 which connects to one terminal of motor 36, and to conductor 53, which connects to one terminal of solenoid valve 39. The other terminal of solenoid 39 is connected through conductor 54 to contact 46 of timer 50. Contact 49 of timer 50 is connected to the other terminal of motor 36. Element 56 of timer 50 in its closed position connects together contacts 46 and 47. Element 57 of timer 50 in its closed position connects together contacts 48 and 49.

Timer 50, which is shown only in outline, may be driven by mechanical clockwork or by synchronous clockwork from the power line. It is of a conventional type which closes element 56 to connect together contacts 46 and 47 for a predetermined period of time and opens element 56 to disconnect those contacts for another predetermined period of time and continues to repeat that cycle. It operates in the same way element 57 to connect together contacts 48 and 49 and to disconnect those contacts. The cycle with respect to each pair of contacts may be adjusted separately. Although a dual timer 50 is shown in the drawings, separate individual timers may be used if desired.

The operation of my process will now be described with respect to the installation above-described and illustrated in my figures. Pump 35 normally operates at a pressure sufficient to force oil through the lubricating channels 13, 14, 15 and 16 to reach the slippers and other wearing parts of the coupling and spade. It is not necessary that pump 35 supply oil under a pressure high enough to keep those lubricating channels open. Compressed air, however, is supplied at a pressure high enough to blow out any dirt or any other material that may work into the lubricating channels above-mentioned. I prefer to set timer 50 so as to supply compressed air through solenoid valve 39 and check valve 41 to my manifold 34 for a period of several minutes and then to shut off that air for a considerably longer period. My timer 50 is likewise adjusted to connect together contacts 48 and 49 and start up pump motor 36 so as to supply lubricant through pipes 42 and 43 to manifold 34 for a period of time shorter than that during which the air is on but concurrently with that air and then to shut off pump 36 for a period of time several times as long. In one installation with which I am familiar the timer is set so that the compressed air is on for a period of three minutes and then off for a period of ten minutes. At the end of the first minute during which air is being supplied, the timer starts up the lubricant pump so that lubricant is supplied for a period of one minute only and then is off for a period of twelve minutes. The lubricant and air from manifold 34 are conducted through pipes 30, 31 and 32 into collar 20 as shown in FIG. 3 and 4.

The relatively high pressure pulse of compressed air which I introduce blows out material which would otherwise tend to obstruct the lubricating passages in the spindle coupling. This air is allowed to flow for a period of time before lubricant is introduced to make sure that the oil passages are free. The lubricant pump 35, therefore, need not introduce lubricant at any considerable pressure because the oil lines are freed of obstruction before the oil is admitted thereto. Moreover, the relatively high pressure compressed air forces the lubricant through the lubricating passages and onto the surfaces to be lubricated. I prefer that the pressure of my compressed air be high enough to atomize the lubricant. I prefer to shut off the flow of lubricant before shutting off the compressed air in order that the air can blow substantially all the lubricant through the lines and between the surfaces to be lubricated. If the lubricant lines are blown clear in this fashion after the flow of lubricant has stopped, there is less tendency for dirt to work into them and form obstructions It will be observed that I introduce air into the lubricating passages in a series of pulses and also introduce lubricant in a series of pulses shorter in length than the pulses of air. It will also be observed that the lengths of the pulses both of air and of lubricant are considerably less than the times between those pulses. In this way the introduction of excess lubricant is avoided.

It will be understood that the lengths of pulses both of air and lubricant, as well as the time between pulses, may be adjusted in accordance with the requirement of the particular installation being lubricated. It will also be understood that in some circumstances it may not be desirable to have a pulse of lubricant coincide with each pulse of air. It may be satisfactory to introduce lubricant with each second or higher numbered pulse of air.

I claim:

1. The method of delivering lubricant to a bearing surface accessible only through a narrow passageway comprising blowing air under pressure through the passageway in a succession of pulses of sufficient intensity and frequency to keep the passageway open to lubricant flow and introducing lubricant into the passageway thus opened under pressure independent of the air pressure in a succession of pulses, the frequency of the pulses of lubricant being less than the frequency of the pulses of air, the duration of each pulse of lubricant being less than the duration of a corresponding pulse of air, and coinciding at least substantially in part therewith.

2. The method of claim 1 in which the duration of a pulse of air is less than the time between pulses of air.

3. The method of claim 1 in which the pulse of lubricant is initiated subsequent to the initiation of a pulse of air, but during that pulse.

4. The method of claim 1 in which the pulse of lubricant is initiated subsequent to the initiation of a pulse of air and is terminated prior to the termination of that pulse of air.

References Cited in the file of this patent

UNITED STATES PATENTS

| | | |
|---|---|---|
| 1,750,070 | Tuttle | Mar. 11, 1930 |
| 1,874,809 | Saives | Aug. 30, 1932 |
| 1,939,836 | Tolfree | Dec. 19, 1933 |
| 1,996,912 | Ericson et al. | Apr. 9, 1935 |
| 2,002,809 | Williamson | May 28, 1935 |
| 2,570,363 | Mercier | Oct. 9, 1951 |
| 2,818,076 | Erling | Dec. 31, 1957 |
| 2,826,268 | Carlson et al. | Mar. 11, 1958 |
| 2,861,848 | Lovelock et al. | Nov. 25, 1958 |